(12) United States Patent
Guan et al.

(10) Patent No.: US 8,818,436 B2
(45) Date of Patent: Aug. 26, 2014

(54) RADIO RESOURCE MAPPING METHOD

(75) Inventors: Yanfeng Guan, Shenzhen (CN); Xiangyu Liu, Shenzhen (CN); Ying Liu, Shenzhen (CN); Huiying Fang, Shenzhen (CN); Hongyun Qu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 488 days.

(21) Appl. No.: 13/129,472

(22) PCT Filed: Nov. 17, 2009

(86) PCT No.: PCT/IB2009/007922
§ 371 (c)(1), (2), (4) Date: May 16, 2011

(87) PCT Pub. No.: WO2010/067200
PCT Pub. Date: Jun. 17, 2010

(65) Prior Publication Data
US 2011/0223954 A1 Sep. 15, 2011

(30) Foreign Application Priority Data
Nov. 17, 2008 (CN) .......................... 2008 1 0177631

(51) Int. Cl.
H04W 72/00 (2009.01)
H04B 7/00 (2006.01)
H04W 4/00 (2009.01)
H04L 5/00 (2006.01)

(52) U.S. Cl.
CPC ...................................... *H04L 5/00* (2013.01)
USPC ........ 455/509; 455/507; 455/452.1; 455/450; 370/329

(58) Field of Classification Search
CPC .................................................. H04W 16/10
USPC ......................................... 455/450, 453, 509
See application file for complete search history.

(56) References Cited

U.S. PATENT DOCUMENTS 8,204,020 B2 * 6/2012 Cho et al. ...................... 370/330
8,204,021 B2 * 6/2012 Cho et al. ...................... 370/330
(Continued)

FOREIGN PATENT DOCUMENTS

CN 101568128 A 10/2009
CN 101621846 A 1/2010
(Continued)

OTHER PUBLICATIONS

IEEE C802.16m 08/1448 , Guan et al , IEEE 802.16 Broadband wireless access working group Nov. 3, 2008, pp. 2-3.*

(Continued)

*Primary Examiner* — Tilahun B Gesesse
(74) *Attorney, Agent, or Firm* — Patterson Thuente Pedersen, P.A.

(57) ABSTRACT

A resource mapping method is provided, in which a wireless communication system maps subcarriers to resource units through external permutation and internal permutation, the external permutation comprises: performing the first permutation on n physical resource units in every N1 physical resource units, orderly selecting n1×N1 physical resource units from the n physical resource units obtained from the first permutation, and then performing the second permutation on the remaining n−n1×N1 physical resource units in every N2 physical resource units, wherein n, N1, and N2 are all integers greater than or equal to 1, and N1 is not equal to N2, and n1 is an integer greater than or equal to 0. Frequency selectivity gain and frequency diversity gain may be achieved through the present invention by enabling a base station to select a proper resource scheduling granularity and resource unit types, thereby improving the spectrum efficiency of the future wireless communication system.

21 Claims, 9 Drawing Sheets

(56) References Cited

U.S. PATENT DOCUMENTS

| | | | |
|---|---|---|---|
| 8,374,614 B2 * | 2/2013 | Choi et al. | 455/447 |
| 8,432,860 B2 * | 4/2013 | Cho et al. | 370/329 |
| 8,520,618 B2 * | 8/2013 | Lee et al. | 370/329 |
| 8,547,903 B2 * | 10/2013 | Lee et al. | 370/328 |
| 8,681,734 B2 * | 3/2014 | Cho et al. | 370/330 |
| 2008/0165743 A1 * | 7/2008 | Palanki et al. | 370/335 |
| 2009/0225714 A1 | 9/2009 | Kim et al. | |
| 2010/0009691 A1 * | 1/2010 | Choi et al. | 455/450 |
| 2010/0220683 A1 * | 9/2010 | Novak et al. | 370/330 |
| 2011/0103218 A1 * | 5/2011 | Lee et al. | 370/203 |
| 2011/0122860 A1 * | 5/2011 | Guan et al. | 370/343 |
| 2011/0211589 A1 * | 9/2011 | Fang et al. | 370/431 |
| 2011/0223954 A1 * | 9/2011 | Guan et al. | 455/509 |
| 2012/0039272 A1 * | 2/2012 | Lee et al. | 370/329 |
| 2012/0093115 A1 * | 4/2012 | Guan et al. | 370/329 |
| 2012/0113955 A1 * | 5/2012 | Cho et al. | 370/330 |
| 2012/0207081 A1 * | 8/2012 | Cho et al. | 370/315 |
| 2012/0275370 A1 * | 11/2012 | Cho et al. | 370/312 |
| 2012/0320860 A1 * | 12/2012 | Chun et al. | 370/329 |
| 2013/0070623 A1 * | 3/2013 | Chun et al. | 370/252 |
| 2013/0128842 A1 * | 5/2013 | Choi et al. | 370/329 |
| 2013/0308584 A1 * | 11/2013 | Lee et al. | 370/329 |

FOREIGN PATENT DOCUMENTS

| | | |
|---|---|---|
| JP | 2012507890 | 3/2012 |
| RU | 2277762 C2 | 11/2004 |
| WO | WO 2007/078173 A1 | 7/2007 |
| WO | WO 2009/113796 A2 | 9/2009 |

OTHER PUBLICATIONS

International Search Report on international application No. PCT/IB2009/007922, mailed May 27, 2010.

English Translation of the Written Opinion of the International Search Authority in international application No. PCT/IB2009/007922, mailed on May 27, 2010.

Proposed amendment text on 802.16m Downlink Physical Structure, IEEE 802.16 Broadband Wireless Access Working Group <http://ieee802.org/16>, Nov. 3, 2008 (5 pgs.).

* cited by examiner

RADIO RESOURCE MAPPING METHOD

PRIORITY CLAIM

The present application is a National Phase entry of PCT Application No. PCT/IB2009/07922, filed Nov. 17, 2009, which claims priority from Chinsee Application No. 200810177631.5, filed Nov. 17, 2008, the disclosures of which are hereby incorporated by reference herein in their entirety.

TECHNICAL FIELD

The present invention relates to the field of communications, and in particular, to a radio resource mapping method.

BACKGROUND

In a wireless communication system, a base station is a device for providing services to terminals and communicates with terminals over uplink/downlink, wherein downlink refers to the direction from the base station to a terminal, and uplink refers to the direction from a terminal to the base station. As for data transmission, a plurality of terminals may transmit data to a base station over uplink simultaneously and receive data from the base station over downlink simultaneously. In a wireless communication system that adopts a base station to achieve radio resource scheduling and control, the scheduling and allocation of system radio resources is performed by a base station, for example, the base station provides downlink resource allocation information when the base station performs downlink transmission and uplink resource allocation information when a terminal performs uplink transmission.

In a wireless communication system that is put into commercial use, a base station generally takes a radio frame as a scheduling period when scheduling air interface radio resources, and partitions radio resources into a plurality of radio resource units (for example, a time slot or a codeword) for scheduling. During a scheduling period, the base station provides data or multimedia services to terminals within its coverage by scheduling the radio resources units. For example, in a 2G wireless communication system represented by GSM (Global System For Mobile Communication), a base station partitions radio resources at each frequency into TDMA (Time Division Multiple Address) radio frames with a period of 4.615 ms, each radio frame comprising 8 time slots, each time slot may transfer a session of one full rate or two half rates and also achieve a low-speed data service; in a 2.5G wireless communication system represented by GRPS (General Packet Radio Service), a data service rate is increased to above 100 kps by introducing fixed time slot-based packet switch; and in a 3G wireless communication system represented by TD-SCDMA (Time-Division Synchronization Code Division Multiple Address), a base station likewise partitions air interface radio resources into radio frames with a period of 10 ms, each 10 ms comprising 14 normal time slots and 6 special time slots, wherein the normal time slots are used to transmit specific services and signaling, in each normal time slot, the base station distinguishes users through different codewords.

Future wireless communication systems represented by LTE (Long Term Evolution), UMB (Ultra Mobile Broadband) and IEEE 802.16m, due to the use of OFDM (Orthogonal Frequency Division Multiplexing) and OFDMA (Orthogonal Frequency Division Multiple Address) technologies, provide technical support for the supply of high-speed data and fluent multimedia services, meanwhile impose new restraints on radio resource management.

Firstly, increasing communication services cause increasing system bandwidth occupied by a future wireless communication system, while continuous large bandwidth becomes less and less. In order to fully utilize scattered frequency resources, the future wireless communication system is required to support a multi-carrier bear, thus making resource mapping of future radio resources more complex. Secondly, in order to support terminals of different types or different capabilities, service types required to be supported in the future become more and more, and the demands on QoS (Quality of Service) of these different service types are different, so are the demands on radio resource units, especially VoIP (Voice over IP) data packets and small control class messages; in addition, interference has become a main bottleneck for the development of wireless communication systems, so a new resource mapping method is needed in order to support interference inhibition measures such as FFR (Fractional Frequency Reuse) and services such as EMBS; finally, channel environment of wireless communication often changes, and resource units also have various types, such as localized resource units and distributed resource units; such change also requires that resource mapping have the capability of supporting these new features.

Therefore, a traditional radio resource unit (such as a time slot or a codeword) and its corresponding sub-channelization and resource mapping process cannot satisfy the demands of future wireless communication systems. In order to guarantee the spectrum efficiency of future wireless communication systems, it is necessary to design a new sub-channelization and resource mapping method for radio resources.

SUMMARY

The present invention is proposed in view of that a traditional radio resource unit and its corresponding sub-channelization and resource mapping process in related technologies cannot satisfy the demands of future wireless communication systems. Therefore, the present invention aims at providing a radio resource mapping method to guarantee spectrum efficiency of future wireless communication systems.

According to one aspect of the present invention, a radio resource mapping method is provided, in which a wireless communication system maps subcarriers to resource units through external permutation and internal permutation, wherein the external permutation comprises:

performing the first permutation on n physical resource units in every N1 physical resource units, orderly selecting n1×N1 physical resource units from the n physical resource units obtained from the first permutation, and then performing the second permutation on remaining n−n1×N1 physical resource units in every N2 physical resource units, wherein n, N1, and N2 are all integers greater than or equal to 1, and N1 is not equal to N2, and n1 is an integer greater than or equal to 0.

After the external permutation, the method may further comprise: mapping the n physical resource units after the external permutation to frequency partitions.

After mapping the physical resource units to the frequency partitions, the method may further comprise: partitioning the physical resource units mapped to the frequency partitions into localized resource groups and/or distributed resource groups through sector-specific permutation and/or direct mapping.

The internal permutation may comprise:

permuting resource units in the distributed resource groups into logical distributed resource units, and directly mapping resource units in the localized resource groups into logical localized resource units.

The n−n1×N1 physical resource units may be or may not be mapped into the original order before the second permutation is performed on the remaining n−n1×N1 physical resource units in every N2 physical resource units.

The mapping the n physical resource units after the external permutation to frequency partitions may comprise: mapping the n physical resource units to frequency partitions according to resource configuration.

The resource configuration may comprise one or a combination of the following: multi-carrier information, n and/or system bandwidth, frequency partition information.

The multi-carrier information may be for indicating at least one of the following information: the number, the size, and locations of physical resource units formed by guard bands between neighboring carriers.

The frequency partition information may comprise one or a combination of the following: the number of frequency partitions, the size of a distributed resource group in a frequency partition, the size of a localized resource group in a frequency partition, N1 or N2, or N1 and N2.

The mapping the n physical resource units to frequency partitions according to resource configuration may comprise: based on the frequency partition information, for the n physical resource units, firstly performing permutation in every max (N1, N2) physical resource units and configuring each frequency partition, and then performing permutation in every min (N1, N2) physical resource units and configuring each frequency partition.

If the n physical resource units comprise physical resource units formed by guard bands between neighboring carriers, then when the external permutation is performed, the physical resource units formed by guard bands between neighboring carriers may be directly mapped, and when they are mapped to the frequency partitions, they may be directly mapped to logical localized resource units in the last frequency partition that comprises logical resource groups.

Wherein N1>N2.

The external permutation may adopt one or a combination of the following: row-column permutation, circle permutation mapping, even extraction permutation, particular sequence permutation, or random permutation.

The internal permutation may adopt row-column permutation; or based on system bandwidth or a sequence length required to be permuted, the internal permutation may determine to adopt one or a combination of the following: row-column permutation, circle mapping permutation, particular sequence permutation, or random permutation.

A radio resource mapping method, in which a wireless communication system maps subcarriers to resource units through external permutation and internal permutation, wherein the external permutation comprises;

directly mapping n1 localized physical resource units in n physical resource units in every N1 physical resource units; performing permutation on remaining n−n1 physical resource units in every N2 physical resource units, and mapping the n physical resource units after direct mapping and permutation to frequency partitions;

wherein the n1 physical resource units after direct mapping are mapped to the frequency partitions and regarded as localized resource units.

Through at least one technical solution of the present invention mentioned above, frequency selectivity gain and frequency diversity gain may be achieved by enabling a base station to select a proper resource scheduling granularity and resource unit types, thereby improving the spectrum efficiency of future wireless communication systems.

DETAILED DESCRIPTION

Before describing the embodiments of the present invention, firstly, a resource mapping process of radio resources in a wireless communication system will be briefly illustrated.

Figure 1:
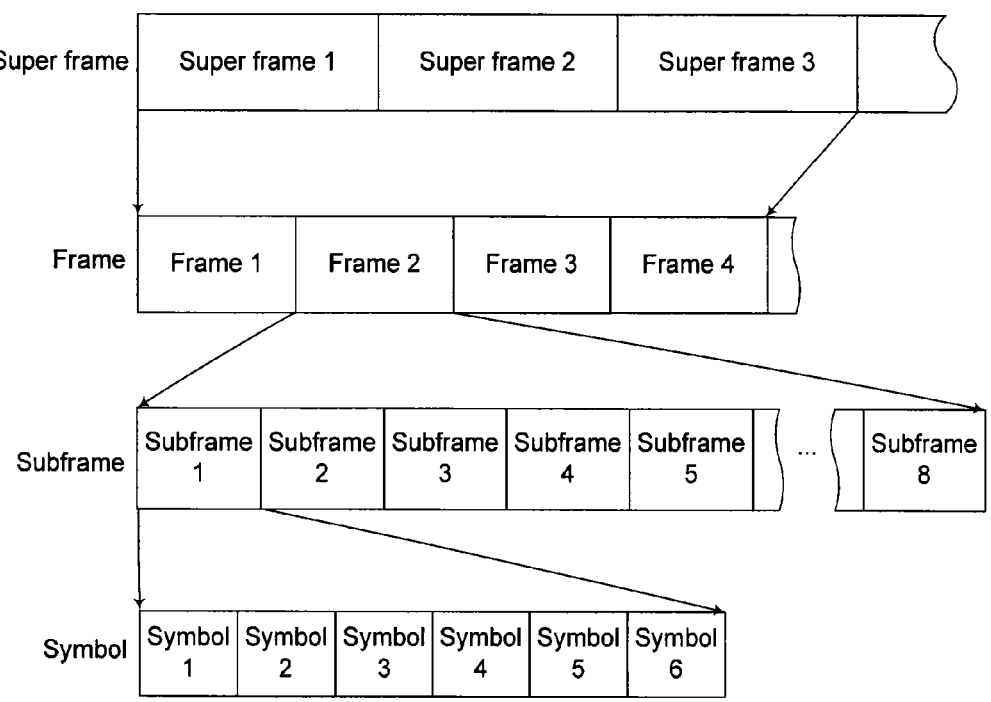
FIG. 1 illustrates a frame structure of a wireless communication system according to relevant technologies.

To put it simply, the radio resource mapping process is a process of mapping physical resources (such as physical subcarriers) into logical resources. Resource mapping in a wireless communication system is mainly based on the frame structure and resource structure of the wireless communication system, the frame structure depicting the structure of radio resources in time domain in the wireless communication system, and resource structure depicting the structure of radio resources in frequency domain in the wireless communication system. In a future wireless communication system (for example, in a wireless communication system based on OFDM and OFDMA technologies), the frame structure generally has the following features: partitioning radio resources into super frames, frames, subframes and symbols for scheduling, firstly partitioning the radio resources into temporally continuous super frames, each super frame comprising a plurality of frames, each frame further comprising a plurality of subframes, each subframe being composed of the most basic OFDM symbols; the number of frames, the number of subframes and the number of OFDM symbols are determined by the basic parameters of the OFDM system; in order to improve the transmission efficiency, a plurality of subframes may be cascaded for unified schedule. As shown in FIG. 1, radio resources are partitioned into super frames in time domain, for example, super frame 1, super frame 2, and super frame 3, each super frame comprising 4 frames, for example, from frame 1 to frame 4, each frame comprising 8 subframes, for example, from subframe 1 to subframe 8, and each subframe further comprising 6 basic OFDM symbols, for example, from symbol 1 to symbol 6.

Figure 2:
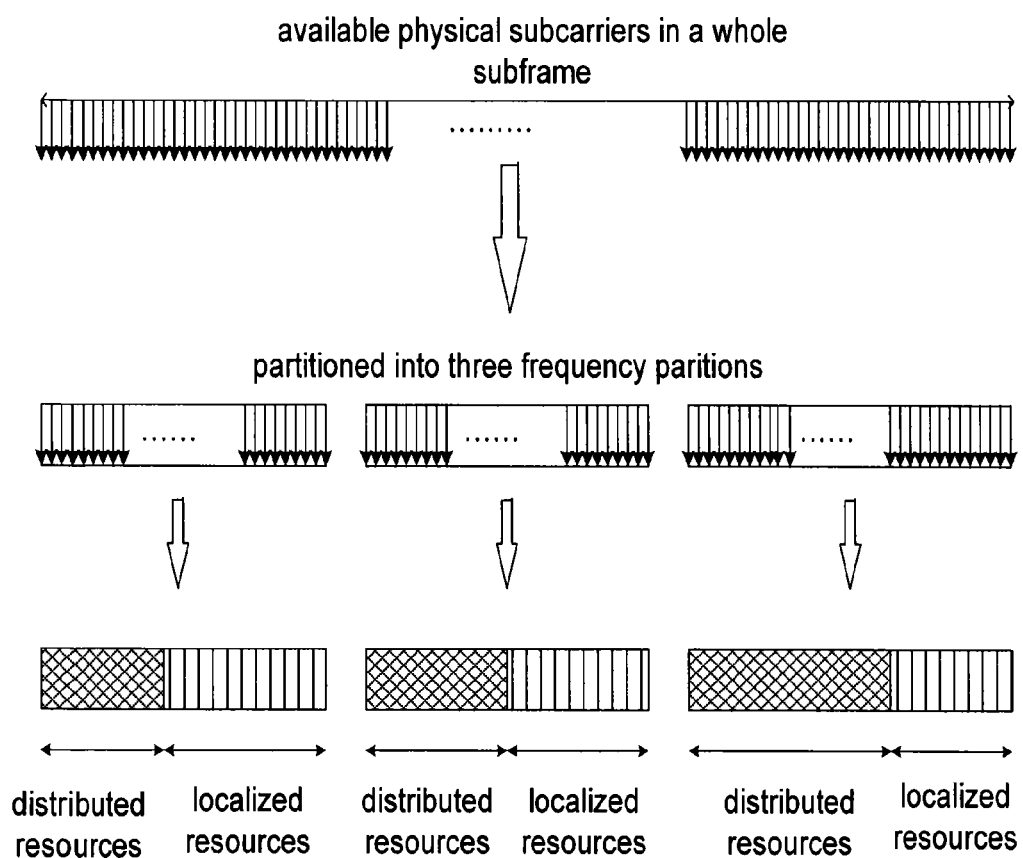
FIG. 2 illustrates a resource structure of wireless communication system according to relevant technologies.

The resource structure of the future wireless communication system has the following main characteristics: partitioning radio resources into a plurality of frequency partitions, each frequency partition being further partitioned into localized resource areas and/or distributed resource areas. As shown in FIG. 2, an available physical subcarrier in a subframe is partitioned into three frequency partitions for supporting three cells, each frequency partition comprising localized resources and distributed resources for realizing scheduling flexibility. Based on the characteristics of the frame structure and resource structure in a future wireless communication system, the embodiments of the present invention provide a radio resource mapping method.

Hereinafter, the present invention will be described in detail through the embodiments with reference to the accompanying drawings. It should be noted that, if there is no conflict, the embodiments of the present invention and the features thereof may be combined with each other.

Figure 3:
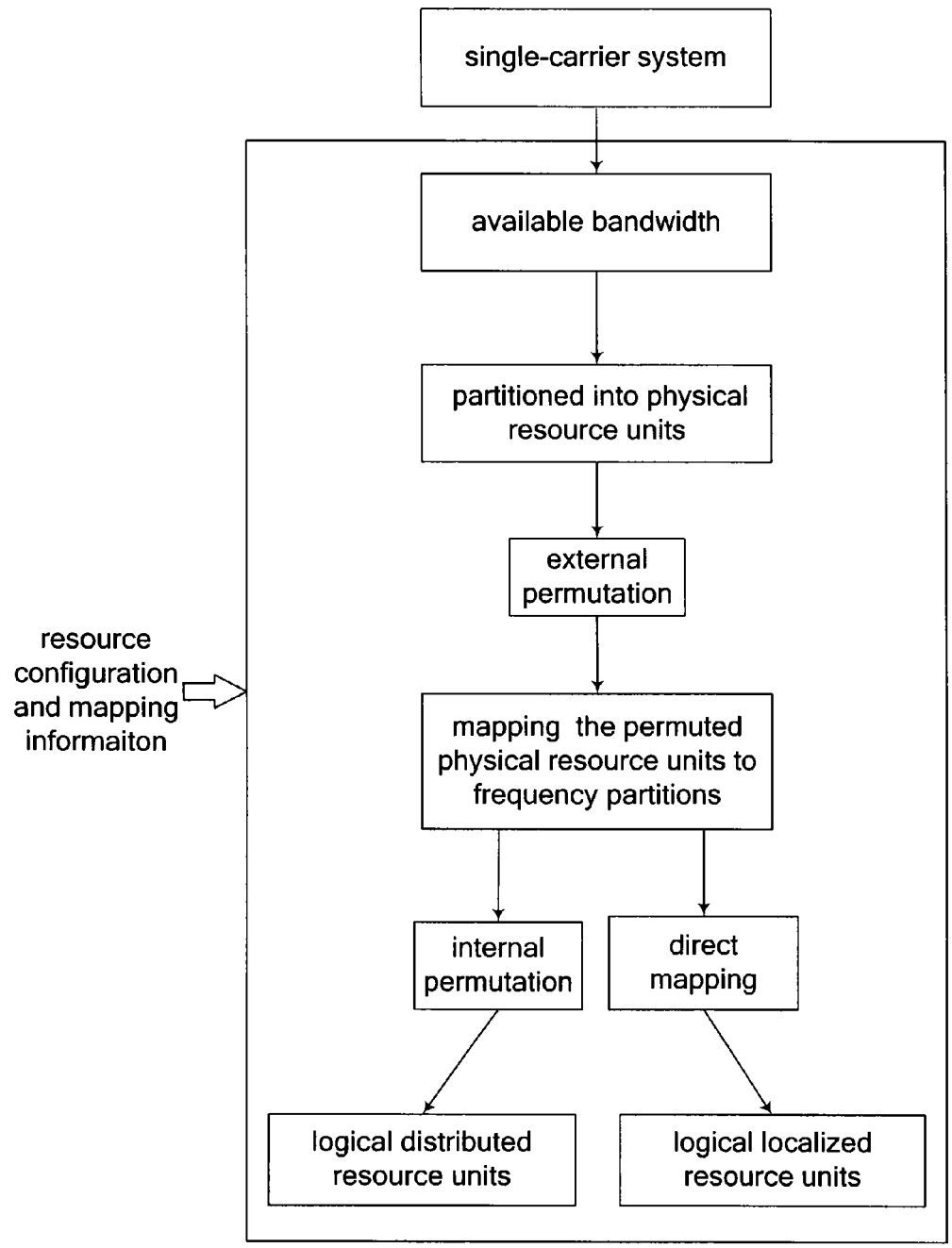
FIG. 3 is a flowchart of a wireless resource mapping method according to an embodiment of the present invention.

According to the embodiments of the present invention, a radio resource mapping method is provided for mapping subcarriers to resource units through external permutation and internal permutation in a wireless communication system. Generally, as shown in FIG. 3, the method may be performed as follows: firstly, partitioning available bandwidth of a single-carrier system into physical resource units (PRUs); then performing external permutation, on one hand, the external permutation herein may be performed by one type of resource scheduling granularity (namely, the number of PRUs used in the permutation) or by two or more different resource scheduling granularities, on the other hand, the external permutation preferably adopts row-column permutation, of course, other suitable permutation manners may also be adopted as required, which is not limited in this invention; next, mapping the permuted physical resource units to frequency partitions, and then performing internal permutation, wherein the process of internal permutation may be understood as internal permutation and direct mapping, and what will be obtained from internal permutation are logical distributed resource units (LDRUs) and what will be obtained from direct mapping are logical localized resource units (LLRUs).

When the physical resource units after external permutation are mapped to frequency partitions, the mapping process may be performed based on resource configuration. Specifically, the resource configuration herein may comprise one or a combination of the following: multi-carrier information, the number n of physical resource units and/or system bandwidth, and frequency partition information. In the above information, the multi-carrier information is for indicating the following information: the number, the size, and locations of physical resource units formed by guard bands between neighboring carriers; and the frequency partition information comprises one or a combination of the following: the number of frequency partitions, the size of a distributed resource group in a frequency partition, the size of a localized resource group in a frequency partition, and granularity (unit) N when external permutation is performed, wherein N may be N1 (for example, 1, 2, or 4), namely one type of granularity, or may be N1 (for example, 4) and N2 (for example, 1 or 2), namely, two kinds of granularities, or may be other circumstances, which will not be enumerated here; the size of a resource group refers to the amount of physical resource units in the resource group.

Based on the granularity (the granularity refers to the number of physical resource units included) of channel quality feedback, system bandwidth, or a sequence length needed to be permuted, the external permutation may select one or a combination of the following: row-column permutation, circle permutation mapping, even extraction permutation, particular sequence permutation, and random permutation; and the internal permutation may, based on system bandwidth or a sequence length needed to be permuted, select to use one or a combination of the following: row-column permutation, circle mapping permutation, particular sequence permutation, and random permutation. For example, if an original sequence is [0, 1, 2, 3, 4, 5, 6, 7, 8, 9, 10, 11], and a permutation length is 12, then a sequence [0, 4, 8, 1, 5, 9, 2, 6, 10, 3, 7, 11] may be obtained if row-column permutation is adopted, and the permutation matrix is [0, 1, 2, 3; 4, 5, 6, 7; 8, 9, 10, 11]; if particular sequence permutation is adopted, the permutation sequence [0, 6, 3, 10, 7, 4, 1, 11, 8, 2, 5, 9] is the sequence order after permutation. In principle, some variations based on row-column permutation still belong to row-column permutation. For example, if an original sequence is [0, 1, 2, 3, 4] and a sequence after permutation is 0, 3, 1, 4, 2, then it is essentially row-column permutation, namely the first five of [0, 1, 2; 3, 4, 5]. If a sequence length to be permuted is relatively short, better discreteness can be achieved by performing row-column permutation, and the implementing process is simple with low complexity; additionally, the even extraction permutation can be replaced by row-column permutation or is equivalent to adopting row-column permutation for the first permutation and mapping physical resource units into the original order before the second permutation. For example, if an original sequence in external permutation is [0, 1, 2, 3, 4, 5], the sequence after even extraction permutation with an interval of 2 is [0, 2, 4, 1, 3, 5], in this case, it is equivalent to the row-column permutation of [0, 1; 2, 3; 4, 5]. The circle mapping permutation, particular sequence permutation, and random permutation have no limitation on the length of permutation sequence.

The resource mapping process of a multi-carrier system is similar to that of a single-carrier system. Based on multi-carrier information, the multi-carrier system determines the usage condition of a guard band at each carrier, for example, the amount of guard bands available for forming physical resource units, etc.; then resource mapping is performed on each carrier according to the resource mapping process of a single carrier.

Embodiment 1

In the radio resource mapping method provided in this embodiment, when external permutation is performed, all physical resource units are required to be permuted, but for logical localized resource units, the external permutation may adopt direct mapping, which will be described in Embodiment 2 hereinafter. As mentioned above, a plurality of manners may be adopted to perform the external permutation, which, for example, includes but is not limited to the following two:

Manner 1: performing by one type of resource scheduling granularity. Performing permutation on all of the n physical resource units in every N1 physical resource units, and mapping the permuted n physical resource units to frequency partitions to perform subsequent internal permutation.

Manner 2: firstly performing the first permutation in every N1 physical resource units; selecting n1×N1 physical resource units in order from the n physical resource units obtained from the first permutation; then performing the second permutation in every N2 on the remaining n−n1×N1 physical resource units and mapping the n physical resource units after the second permutation to frequency partitions, wherein n, n1, N1, N2 are integers greater than or equal to 1, and N1 is not equal to N2, and preferably, it may be N1>N2. Therefore, it can be guaranteed that all physical resource units are continuous when performing permutation in every N1 physical resource units; moreover, there would be no limitation to the subsequent permutation performed in every N2 physical resource units.

It should be noted that the external permutation and internal permutation as mentioned in the embodiments of the present invention are directed to a process, not to specific operations. The external permutation includes a permutation operation, and may also include a direct mapping operation; likewise, the internal permutation includes a permutation operation, and may also comprise a direct mapping operation. The above description is made in order not to unnecessarily confuse the present invention, which does not affect the essence of the present invention and should not be understood to constitute any limitation to the present invention.

Hereinafter, examples will be provided to illustrate the implementing process of the radio resource mapping method of embodiment 1 of the present invention.

Example 1

Figure 4:
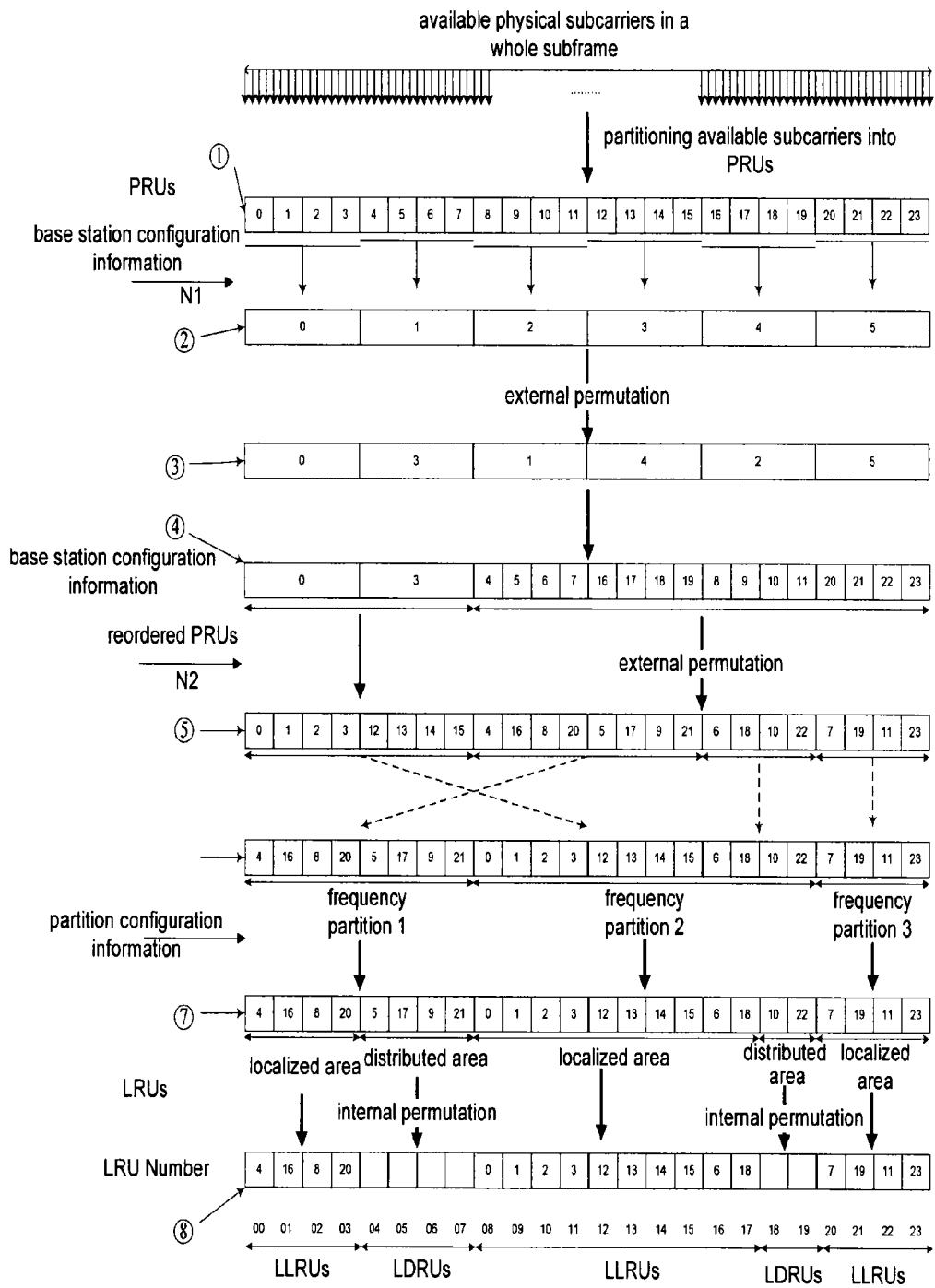
FIG. 4 illustrates a resource mapping process of a 5 MHz wireless communication system according to an embodiment of the present invention.

FIG. 4 illustrates a resource mapping process in a 5 MHz wireless communication system according to an embodiment of the present invention; wherein the amount of FFT points of the 5 MHz system is 512, the number of available subcarriers in a subframe is 432, and the available subcarriers are partitioned into n=24 physical resource units each with a size of 18×6, as shown in ① of FIG. 4. The 24 physical resource units are partitioned in every 4 physical resource units (namely, N1=4), which are partitioned into 6 parts from 0 to 5, as shown in ② of FIG. 4.

Next, external permutation, namely the first permutation mentioned above, is performed on the 6 parts from 0 to 5 by using row-column permutation, the permutation matrix is [0, 1, 2; 3, 4, 5], the order after permutation is 0, 3, 1, 4, 2, 5, as shown in ③ of FIG. 4. Then, two parts 0 and 3 (namely, n1=2) are extracted in order, totally having 2×4=8 physical resource units, respectively being 0, 1, 2, 3, 12, 13, 14, 15, as shown in ④ of FIG. 4.

The remaining n−n1=24−8=16 physical resource units are partitioned in every 1 physical resource unit (namely, N2=1) and subjected to external permutation by using row-column permutation, namely the above mentioned second permutation, the permutation matrix is a 4×4 matrix, and the order after permutation is 4, 16, 8, 20, 5, 17, 9, 21, 6, 18, 10, 22, 7, 19, 11, 23, as shown in ⑤ of FIG. 4.

The physical resource units after the above-mentioned external permutation are allocated to the frequency partitions, as shown in ⑥ of FIG. 4, and are directly mapped to localized resource groups and distributed resource groups, as shown in ⑦ of FIG. 4. Preferably, the physical resource units within the frequency partitions may be partitioned into localized resource groups and/or distributed resource groups through sector-specific permutation and direct mapping, or only through sector-specific permutation.

In this embodiment, based on resource configuration information, a whole subframe may be partitioned into 3 frequency partitions. Specifically, as shown in FIG. 4, frequency partition 1 comprises 8 physical resource units, the first 4 physical resource units forming a localized resource group (or called localized area) and the latter 4 physical resource units forming a distributed resource group; frequency partition 2 comprises 12 physical resource units, the first 10 physical resource units forming a localized resource group, and the latter 2 physical resource units forming a distributed resource group; frequency partition 3 comprises 4 physical resource units, the 4 physical resource units forming a localized resource group. It can be seen that a frequency partition may comprise a localized resource group and a distributed resource group, or only a localized resource group, or only a distributed resource group.

Further, it should be noted that for the physical resource units mapped to frequency partitions, preferably, each frequency partition may firstly be configured by a unit of max (N1, N2), i.e., being configured in every 4 physical resource units, and then be configured by a unit of min (N1, N2), namely, being configured in every 1 physical resource unit. Specifically, the localized resource group in frequency partition 2 requires external mapping which is performed in every 4 physical resource units, and other localized resource groups and distributed resource groups require external mapping which is performed in every 1 physical resource unit.

Next, internal permutation is performed to obtain logical resource units (LRUs), as shown in ⑧ of FIG. 4. The process of internal permutation permutes a distributed resource group into logical distributed resource units (LDRUs). Specifically, the resource units in a downlink distributed resource group are mapped into downlink logical distributed resource units through sub-carrier permutation, and the resource units in an uplink distributed resource group are mapped into uplink logical distributed resource units through Tile permutation. Based on this, for the downlink localized resource group, the resource units therein are directly mapped into logical localized resource units, and for downlink distributed resource units, circle permutation mapping is used to perform permutation on data subcarriers within the distributed resource group, the circle permutation formula is $j'=(a*j+s) \mod Nsc$, wherein Nsc is the sum of data subcarriers within the distributed resource group, a and Nsc are coprime, s is a numeral from 0 to Nsc, j denotes the serial number of a subcarrier before internal permutation, from 0 to Nsc, and j' denotes a serial number after circle permutation.

Till now, after external permutation and internal permutation, logical localized resource units and logical distributed resource units are obtained, thus the resource mapping process in the 5 MHz wireless communication system is finished.

Figure 4A:
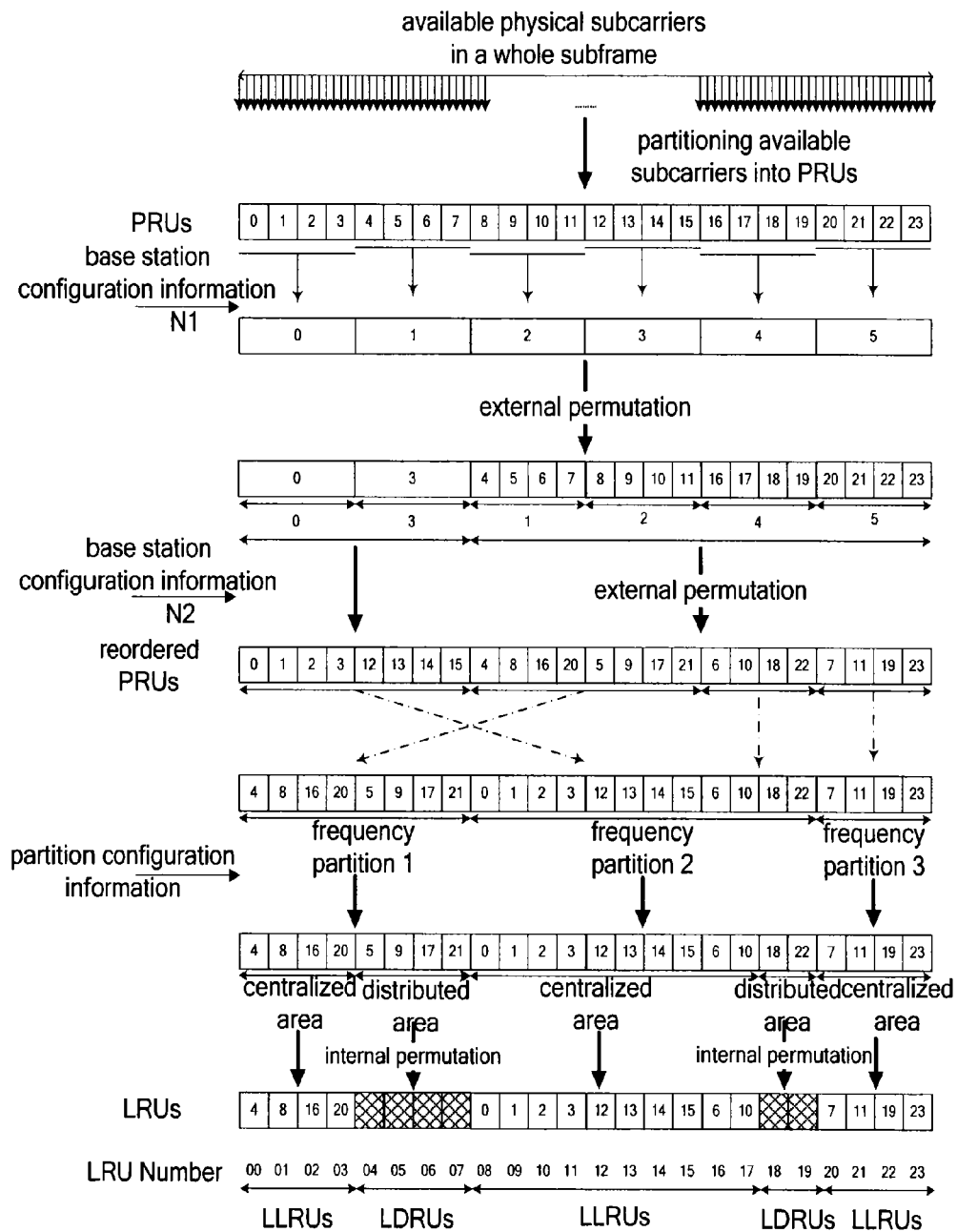
FIG. 4a illustrates another resource mapping process of the 5 MHz wireless communication system according to an embodiment of the present invention.

In the first permutation of the external permutation, when even extraction permutation is adopted, if the interval is 2, the sequence after permutation is [0, 3, 1, 2, 4, 5]. This permutation sequence essentially belongs to specific permutation or is equivalent to performing the first permutation adopting row-column permutation and mapping physical resource units into the original order before the second permutation is performed, as shown in FIG. 4a.

Example 2

Figure 5:
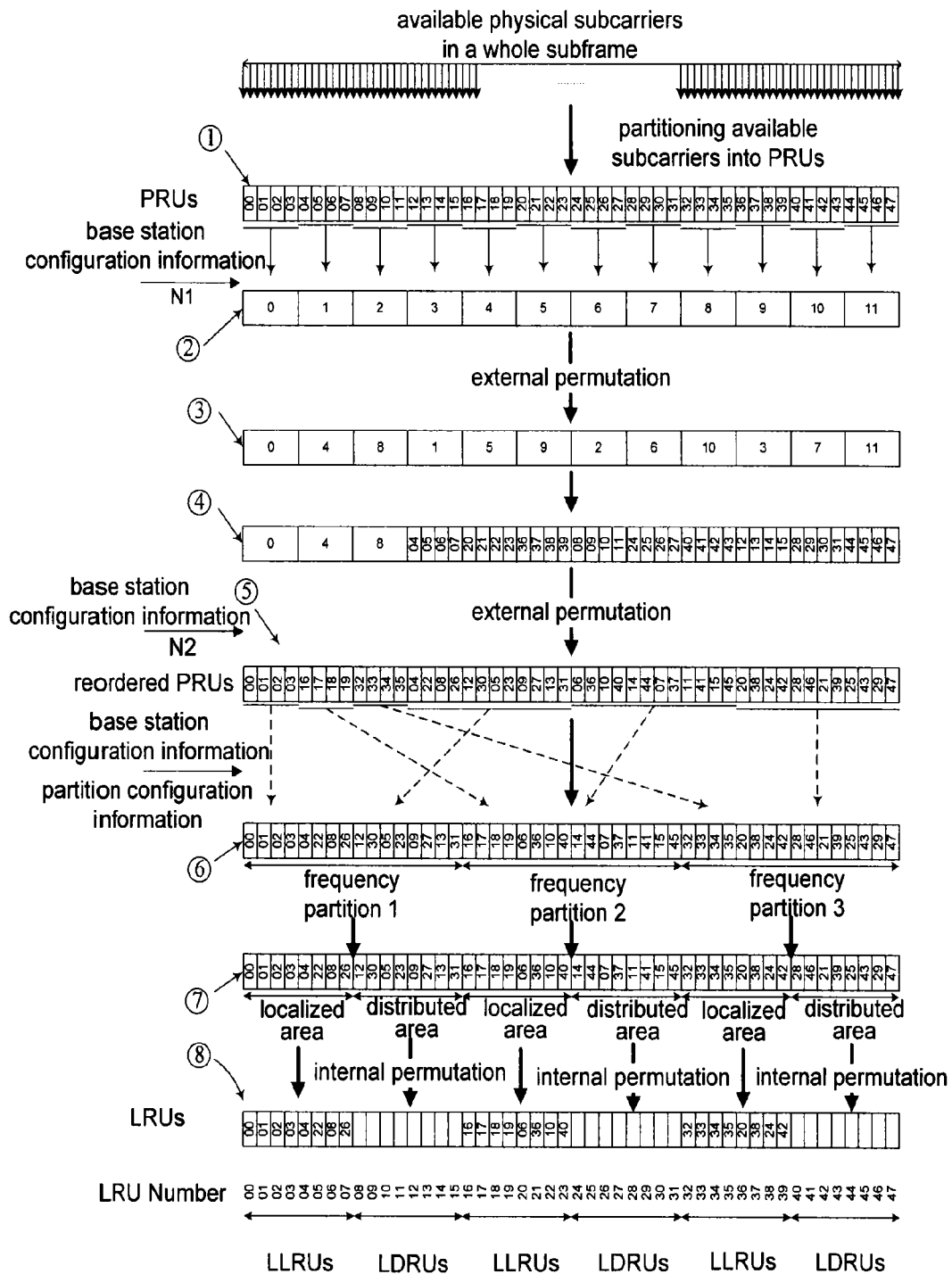
FIG. 5 illustrates a resource mapping process of a 10 MHz wireless communication system according to an embodiment of the present invention.

FIG. 5 illustrates a resource mapping process in a 10 MHz wireless communication system according to an embodiment of the present invention. The details same or similar to example 1 will not be described here.

In the 10 MHz system the amount of FFT (Fast Fourier Transform) points is 1024, the number of available subcarriers in a subframe is 864, and the available subcarriers are divided into 48 physical resource units from 0 to 47, as shown in ① of FIG. 5, wherein the size of each physical resource unit is 18×6. Similar to FIG. 4, the 48 physical resource units are partitioned in every 4 physical resource units (N1=4), thus being partitioned into 12 parts from 0 to 11, as shown in ② of FIG. 5.

Next, external permutation is performed on the 12 parts from 0 to 11 by adopting row-column permutation, i.e., the above-mentioned first permutation, the permutation matrix is 4×3, and the order after permutation is 0, 4, 8, 1, 5, 9, 2, 6, 10, 3, 7, 11, as shown in ③ of FIG. 5.

The three parts 0, 4 and 8 are extracted in order, totally having 3×4=12 physical resource units, respectively being 00, 01, 02, 03, 16, 17, 18, 19, 32, 33, 34, 35, as shown in ④ of FIG. 5.

The remaining 36 physical resource units are partitioned in every 1 physical resource unit and subjected to external permutation adopting row-column permutation, namely, the above-mentioned second permutation, wherein the permutation matrix is a 6×6 matrix. The result of permutation is illustrated in ⑤ of FIG. 5.

Based on base station configuration information or partition configuration information, the physical resource units after the above external permutation are allocated to frequency partitions, as shown in ⑥ of FIG. 5, and are directly mapped to localized resource groups and distributed resource groups, as shown in ⑦ of FIG. 5. In this embodiment, there are 3 frequency partitions in total, wherein frequency partition 1 totally has 16 physical resource units, with the first 8 physical resource units forming a localized resource group, and the latter 8 physical resource units forming a distributed resource group; frequency partition 2 totally has 16 physical resource units, with the first 8 physical resource units forming a localized resource group, and the latter 8 physical resource units forming a distributed resource group; frequency partition 3 has 16 physical resource units in total, with the first 8 physical resource units forming a localized resource group, and the latter 8 physical resource units forming a distributed resource group.

Next, internal permutation is performed to directly map the physical resource units in the localized areas into logical localized resource units, and to permute the physical resource units in the distributed areas into logical distributed resource units, as shown in ⑧ of FIG. 5.

Figure 5A:
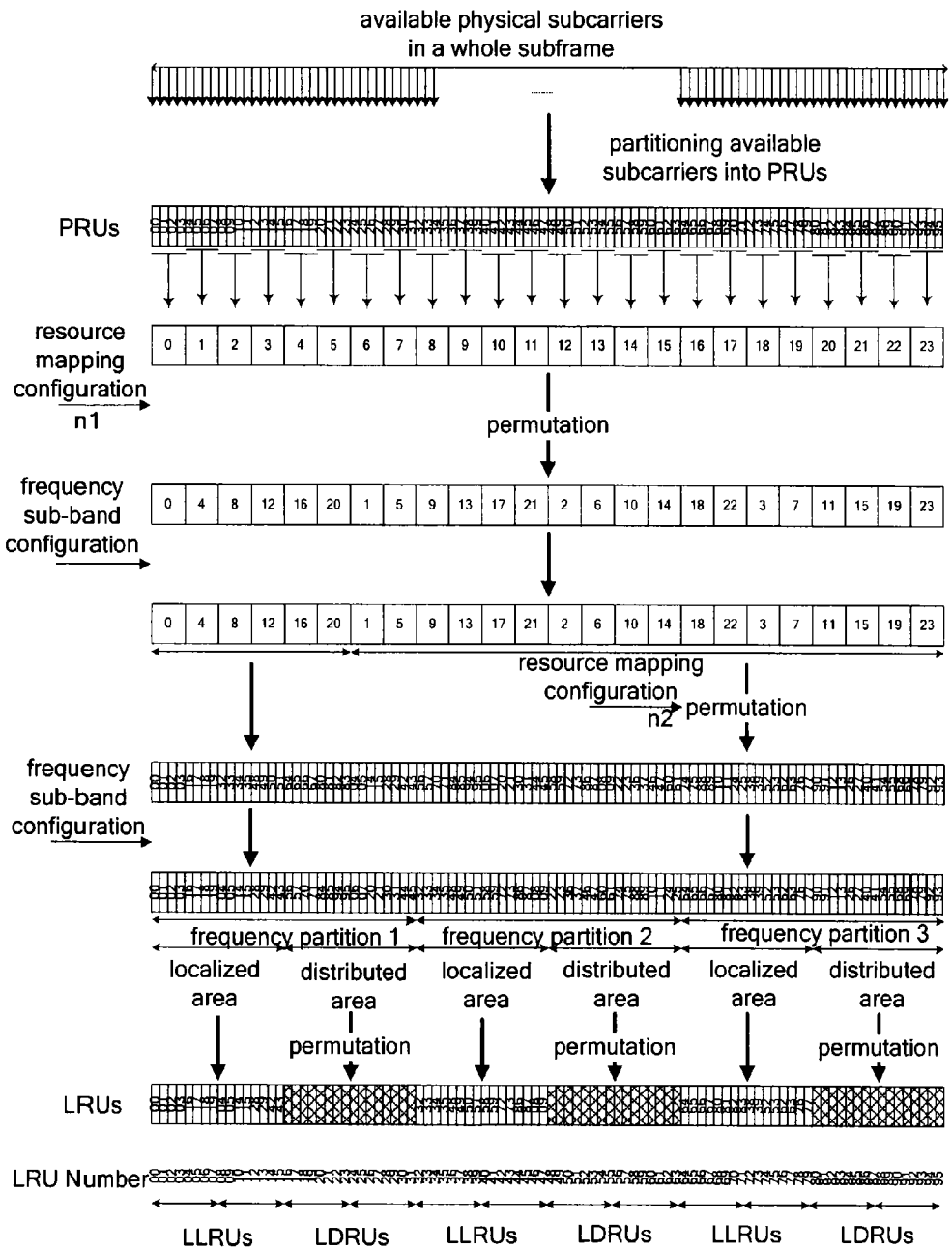
FIG. 5a illustrates a resource mapping process of a 20 MHz wireless communication system according to an embodiment of the present invention.

FIG. 5a illustrates a resource mapping process in a 20 MHz wireless communication system according to an embodiment of the present invention. This process mainly differs from above each process in n2=2, namely, the second permutation is performed in every 2 physical resource units, and circle mapping permutation is adopted for the second permutation of the external permutation. Details same or similar to example 1 will not be described here.

Till now, after external permutation and internal permutation, logical localized resource units and logical distributed resource units are obtained, thus the resource mapping process is finished.

Embodiment 2

In the above illustrated embodiment, when external permutation is performed, all physical resource units are permuted. However, the present invention is not limited thereto. During external permutation, direct mapping may be performed on a part of physical resource units, such as localized resource units, and permutation may be performed on another part of physical resource units. It should be noted that, the physical resource units subjected to direct mapping during external permutation can only act as localized resource units and be located in localized areas when they are subsequently mapped to frequency partitions. The present invention may be better understood through the example illustrated by FIG. 6.

Example 3

Figure 6:
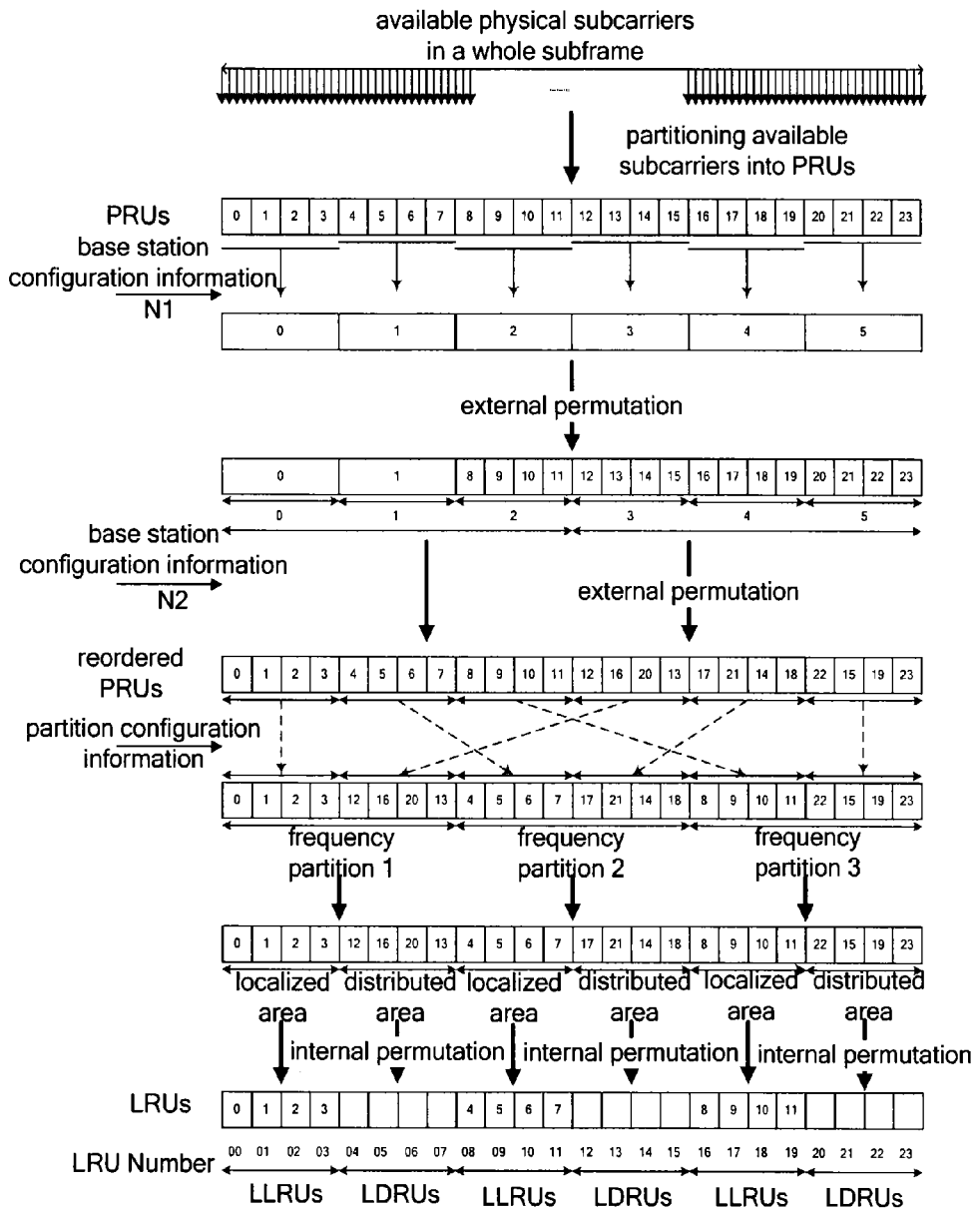
FIG. 6 illustrates another resource mapping process of the 5 MHz wireless communication system according to an embodiment of the present invention.

FIG. 6 illustrates a resource mapping process in a 5 MHz wireless communication system according to an embodiment of the present invention. During this process, external permutation comprises direct mapping.

Similar to example 1 of FIG. 4, 24 physical resource units are partitioned in every 4 physical resource units, which are totally partitioned into 6 parts from 0 to 5. What is different from example 1 is that in example 3, as shown in FIG. 6, the three parts 0, 1, and 2, namely, the physical resource units 0, 1, 2, 3, 4, 5, 6, 7, 8, 9, 10, 11 are used as logical localized resource units after direct mapping, and the remaining physical resource units, namely the physical resource units in the three parts 3, 4 and 5, respectively being 12, 13, 14, 15, 16, 17, 18, 19, 20, 21, 22, 23, are subjected to external permutation adopting row-column permutation performed in every 1 physical resource unit, the permutation matrix is 3×4, and the result after permutation is 12, 16, 20, 13, 17, 21, 14, 18, 22, 15, 19, 23.

Similarly, the physical resource units after external permutation are preferably allocated to frequency partitions based on partition configuration information and directly mapped to localized resource groups and distributed resource groups. There are three frequency partitions in total, each frequency partition comprising 8 physical resource units, with the first 4 physical resource units forming a localized resource group, and the latter 4 physical resource units forming a distributed resource group. It can be seen that the physical resource units in the directly mapped three parts are located in the localized areas and act as localized resource units when being mapped to the frequency partitions. Specifically, physical resource units 0, 1, 2 and 3 in part 0 form the localized resource group of frequency partition 1, physical resource units 4, 5, 6 and 7 in part 1 form the localized resource group of frequency partition 2, and physical resource units 8, 9, 10 and 11 in part 2 form the localized resource group of frequency partition 3. The above-mentioned localized resource groups are directly mapped into logical localized resource units when internal permutation is performed.

It should be noted that, during the external permutation, mapping the localized resource units (namely, from 0 to 11) subjected to direct mapping to frequency partitions is not limited to the above-mentioned circumstance. For example, the resource units therein may be mapped to different frequency partitions, 8 and 9 are mapped to frequency partition 2, and 10 and 11 are mapped to frequency partition 3, etc.; all in all, various alterations and modifications to the frequency mapping process are allowed according to the spirit of this invention, all of which fall within the protection scope of this invention.

Till now, after external permutation and internal permutation, logical localized resource units and logical distributed resource units are obtained, thus the resource mapping process in the 5 MHz wireless communication system is finished.

It should be noted that the n physical resource units mentioned in embodiment 1 and embodiment 2 do not include the physical resource units formed by guard bands between neighboring carriers. Embodiment 3 below will describe the case of existence of physical resource units formed by guard bands between neighboring carriers.

Embodiment 3

If there are physical resource units formed by guard bands between neighboring carriers, then it is necessary to perform direct mapping on the above-mentioned physical resource units without performing permutation. Similar to the direct mapping in the external permutation depicted in embodiment 2, the physical resource units subjected to direct mapping can only be located in localized resource groups when subsequently being mapped to frequency partitions, and are directly mapped into logical localized resource units when external permutation is performed. Hereinafter, the technical solution of embodiment 3 will be illustrated with reference to FIG. 7 and example 4.

Example 4

Figure 7:
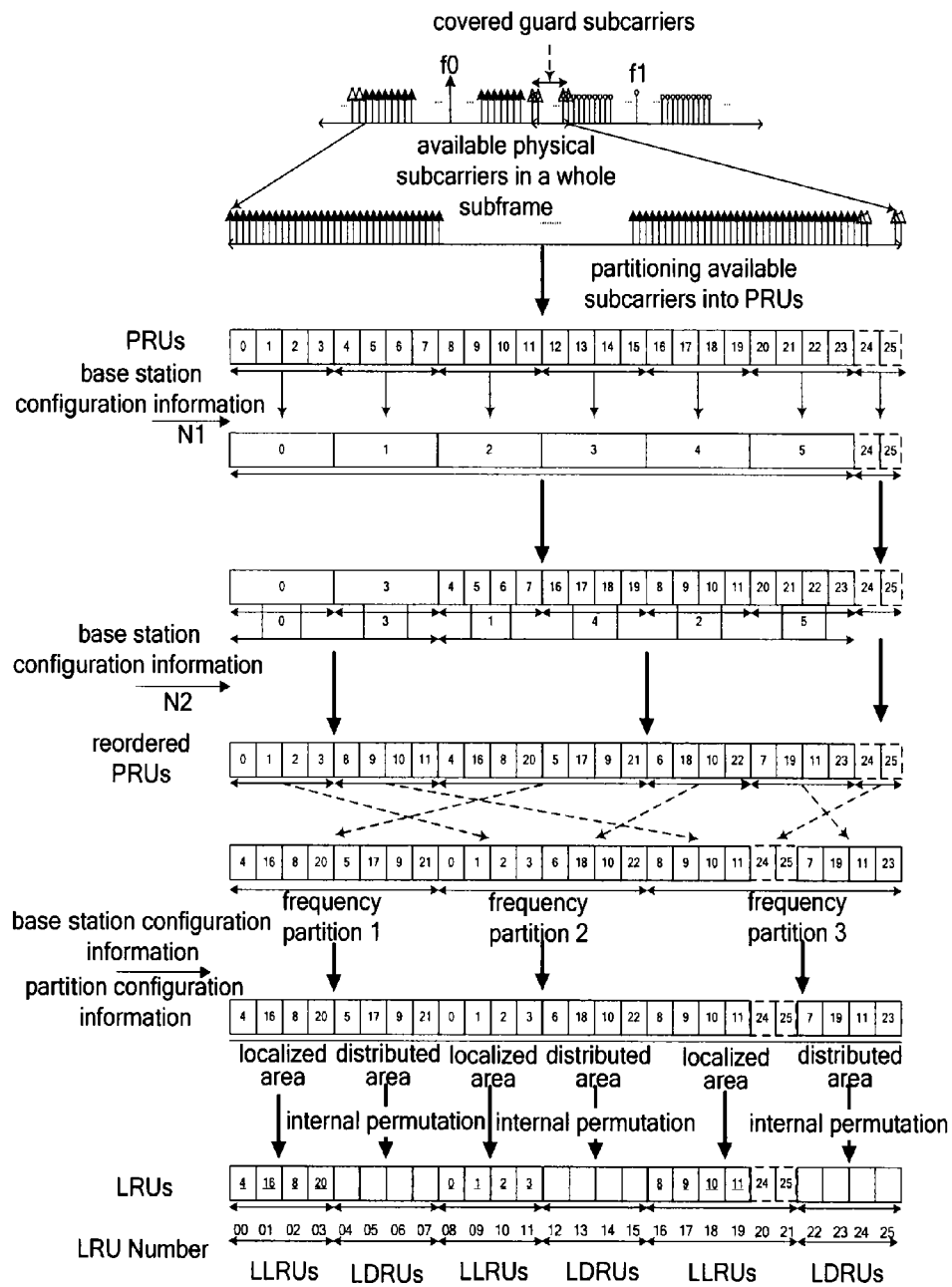
FIG. 7 illustrates a resource mapping process of a wireless communication system in a multi-carrier mode according to an embodiment of the present invention.

FIG. 7 illustrates a resource mapping process in a multi-carrier mode according to an embodiment of the present invention. In this scenario, there are two neighboring 5 MHz systems; resource mapping is performed on partly overlapped guard subcarriers in the middle for data transmission. In the first 5 MHz system, besides the 24 physical resource units from 0 to 23, there are also 2 physical resource units formed by guard subcarriers, namely, 24 and 25 as shown in FIG. 7, during external permutation, the two physical resource units after direct mapping are used as localized resource units. It should be noted that based on multi-carrier configuration information, the last physical resource unit does not necessarily comprise the same amount of subcarriers with the pre-specified (for example, specified through standards or protocols) physical resource unit, for instance, the physical resource unit 25 in this example comprises less subcarriers than physical resource unit 0, it is determined by the amount of available guard subcarriers.

Next, external permutation is performed on the 6 parts from 0 to 5 by adopting row-column permutation, and direct mapping is carried out on the physical resource units 24 and 25. The permutation matrix here is [0, 1, 2; 3, 4, 5], and the order after permutation is 0, 3, 1, 4, 2, 5. Then, the two parts 0 and 3 are extracted in order, totally having 2×4=8 physical resource units, respectively being 0, 1, 2, 3, 12, 13, 14, 15.

The remaining 24−8=16 physical resource units are partitioned in every 1 physical resource unit (namely, N2=1) and subjected to external permutation adopting row-column permutation, the permutation matrix is 4×4, and the order after permutation is 4, 16, 8, 20, 5, 17, 9, 21, 6, 18, 10, 22, 7, 19, 11, 23. In this way, the external permutation is finished.

The physical resource units after external permutation are allocated to frequency partitions, and are partitioned into localized areas and distributed areas based on base station configuration information and/or partition configuration information. As shown in FIG. 7, there are 3 frequency partitions in total, the physical resource units 24 and 25 subjected to direct mapping are located in frequency partition 3, specifically in the localized area of the frequency partition 3.

Till now, after external permutation and internal permutation, logical localized resource units and logical distributed resource units are obtained, and the resource mapping process in a multi-carrier mode is finished under the circumstances that there are physical resource units formed by guard subcarriers. Other details of this embodiment may be understood with reference to example 1. Same or similar parts will not be described here.

To sum up, it can be seen that the present invention proposes a new radio resource mapping method based on the characteristics of future wireless communication systems, so as to support future wireless communication systems and standardize the resource mapping process of their radio resource units, thereby guaranteeing the flexibility of radio resource scheduling in the future wireless communication systems, and improving radio resource scheduling efficiency, and finally guaranteeing the QoS of various services and ensuring the spectrum efficiency of the future wireless communication systems.

It is clear that, those skilled in the art should understand that the steps of this invention mentioned above may be implemented by a universal computing device. They may be collectively arranged in a single computing device, or distributed in a network comprising a plurality of computing devices. Alternatively, they may be implemented with program codes that could be executed by a computing device, thus they may be stored in a memory device and then executed by a computing device; or they may be manufactured into respective integrated circuit modules, or a plurality of modules or steps therein may be manufactured into a single integrated circuit module for implementation. Therefore, the present invention is not limited to any particular combination of hardware and software.

What is described above are only preferred embodiments of the present invention, which are not to limit the present invention. To the skilled in the art, the present invention may have various changes and alterations. Any modifications, equivalent substitutes, and improvements within the spirit and principle of the present invention should be included in the protection scope of the present invention.

What is claimed is:

1. A radio resource mapping method, in which a wireless communication system maps subcarriers to resource units through external permutation and internal permutation, wherein the external permutation comprises:
    Performing, by a base station, the first permutation on n physical resource units in every N1 physical resource units, orderly selecting n1×N1 physical resource units from the n physical resource units obtained from the first permutation, and performing, by the base station, the second permutation on remaining n−n1×N1 physical resource units in every N2 physical resource units, wherein n, N1, and N2 are all integers greater than or equal to 1, and N1 is not equal to N2, and n1 is an integer greater than or equal to 0, and n, n1, N1, and N2 are less than or equal to the amount of physical resource units;
    after the external permutation, the method further comprising: mapping the n physical resource units after the external permutation to frequency partitions; and
    partitioning the physical resource units manned to the frequency partitions into localized resource groups and/or distributed resource groups through sector-specific permutation and/or direct mapping;
    wherein the internal permutation comprises: permuting resource units in the distributed resource groups into logical distributed resource units, and directly mapping resource units in the localized resource groups into logical localized resource units.

2. The method according to claim 1, wherein before the second permutation is performed on remaining n−n1×N1 physical resource units in every N2 physical resource units, the n−n1×N1 physical resource units are mapped into the original order or not.

3. The method according to claim 2, wherein N1>N2.

4. The method according to claim 2, wherein the external permutation adopts one or a combination of the following: row-column permutation, circle permutation mapping, even extraction permutation, particular sequence permutation or random permutation.

5. The method according to claim 1, wherein the mapping the n physical resource units after the external permutation to frequency partitions comprises: mapping the n physical resource units to frequency partitions according to resource configuration.

6. The method according to claim 5, wherein the resource configuration comprises one or a combination of the following: multi-carrier information, the number n of the physical resource units and/or system bandwidth, frequency partition information.

7. The method according to claim 6, wherein the multi-carrier information is for indicating at least one of the following information: the number, the size, and locations of physical resource units formed by guard bands between neighboring carriers.

8. The method according to claim 6, wherein the frequency partition information comprises one or a combination of the following: the number of frequency partitions, the size of a distributed resource group in a frequency partition, the size of a localized resource group in a frequency partition, N1 or N2, or N1 and N2.

9. The method according to claim 8, wherein N1>N2.

10. The method according to claim 8, wherein the internal permutation adopts row-column permutation; or based on system bandwidth or a sequence length required to be permuted, the internal permutation determines to adopt one or a combination of the following: row-column permutation, circle mapping permutation, particular sequence permutation, or random permutation.

11. The method according to claim 8, wherein the mapping the n physical resource units to frequency partitions according to resource configuration comprises: based on the frequency partition information, for the n physical resource units, firstly performing permutation in every max (N1, N2) physical resource units and configuring each frequency partition, and then performing permutation in every min (N1, N2) physical resource units and configuring each frequency partition.

12. The method according to claim 11, wherein N1>N2.

13. The method according to claim 11, wherein the external permutation adopts one or a combination of the following: row-column permutation, circle permutation mapping, even extraction permutation, particular sequence permutation or random permutation.

14. The method according to claim 11, wherein the internal permutation adopts row-column permutation; or based on system bandwidth or a sequence length required to be permuted, the internal permutation determines to adopt one or a combination of the following: row-column permutation, circle mapping permutation, particular sequence permutation, or random permutation.

15. The method according to claim 1, further comprising: during the external permutation, directly mapping physical resource units formed by guard bands between neighboring carriers, moreover, when they are mapped to the frequency partitions, directly mapping them to logical localized resource units in the last frequency partition that comprises logical resource groups, wherein the physical resource units formed by guard bands between neighboring carriers are included in the n physical resource units.

16. The method according to claim 15, wherein N1>N2.

17. The method according to claim 15, wherein the external permutation adopts one or a combination of the following: row-column permutation, circle permutation mapping, even extraction permutation, particular sequence permutation or random permutation.

18. The method according to claim 15, wherein the internal permutation adopts row-column permutation; or based on system bandwidth or a sequence length required to be permuted, the internal permutation determines to adopt one or a combination of the following: row-column permutation, circle mapping permutation, particular sequence permutation, or random permutation.

19. The method according to claim 1, wherein N1>N2.

20. The method according to claim 1, wherein the external permutation adopts one or a combination of the following: row-column permutation, circle permutation mapping, even extraction permutation, particular sequence permutation or random permutation.

21. The method according to claim 1, wherein the internal permutation adopts row-column permutation; or based on system bandwidth or a sequence length required to be permuted, the internal permutation determines to adopt one or a combination of the following: row-column permutation, circle mapping permutation, particular sequence permutation, or random permutation.

* * * * *